Patented Oct. 9, 1945

2,386,356

UNITED STATES PATENT OFFICE 2,386,356

PROCESS AND REAGENT FOR TREATING HYDROCARBONS

Walter A. Schulze and Lloyd C. Morris, Bartlesville, Okla., assignors to Phillips Petroleum Company, a corporation of Delaware No Drawing. Application November 7, 1941, Serial No. 418,264

10 Claims. (Cl. 260—681.5)

This invention relates to a process for the treatment of hydrocarbon mixtures containing diolefins for the separation and recovery of said diolefins. More specifically it relates to an improved process for the separation and recovery of diolefins from hydrocarbon liquid mixtures through the application of novel cuprous halide reagent solutions in miscible non-aqueous solvents.

The production of diolefins, for example butadiene, frequently involves the production and/or segregation of complex hydrocarbon mixtures comprising said diolefins and the corresponding mono-olefins and paraffins along with hydrocarbons of smaller and larger number of carbon atoms. The concentration of the desired diolefin in such a hydrocarbon mixture depends on the method of manufacture and on previous purifying or concentrating procedures and may vary over a wide range. Ordinarily it is not commercially feasible to separate out a pure diolefin by simple fractionation because of the closeness of the boiling points of the hydrocarbons associated therewith. Hence, solvent extraction, physical adsorption, or chemical reaction or absorption are utilized. In general, the absorption of the desired diolefin from complex mixtures is dependent on the use of a process or a reagent of suitable specificity so that the final reaction product comprises substantially pure diolefin to the exclusion of the other components of the original mixture. Said final product may be a diolefin addition compound or the like which is sufficiently unstable to permit substantially complete diolefin recovery by convenient means.

Use is sometimes made of the reaction between diolefins and inorganic metal salts, particularly salts of metals of group I of the periodic system and more particularly of cuprous halides to form addition complexes of the general formula $(MX)_x \cdot C_nH_{2n-2}$. Such addition complexes are relatively insoluble in the hydrocarbon mixtures and may be dissociated by simple treatment such as moderate heating to recover the metal salt and the diolefin.

However, in bringing about the above-mentioned reaction for the separation of diolefins certain factors add greatly to the difficulties encountered in securing efficient and rapid reaction and in recovering a satisfactory pure product. These factors include the insolubility of the preferred cuprous salts in water and most ordinary solvents, and the instability and corrosivity of aqueous cuprous salt solutions prepared with the aid of inorganic solutizing agents. Further, reaction between such aqueous solutions and hydrocarbon fluids is slow, and mechanical difficulties are introduced by the precipitation of the solid diolefin complex in the reagent solution. Finally, extraneous gases and hydrocarbons other than diolefins are retained by the reagent solutions and the solid complex so that the purity of the recovered diolefin is adversely affected.

It is an object of this invention to provide an improved process for the separation and recovery of diolefins from hydrocarbon mixtures.

It is another object of this invention to provide new and improved methods for preparing cuprous halide reagent solutions.

It is a further object of this invention to provide non-aqueous, hydrocarbon-miscible, non-corrosive solutions of cuprous halides for reacting with diolefins.

Still another object of this invention is to provide an improved process for the formation of hydrocarbon-insoluble addition compounds of low-boiling aliphatic diolefins with cuprous chloride by the use of solutions of cuprous chloride in certain olefinic liquids.

We have now discovered that the efficiency of cuprous halide reagents may be greatly increased and their use simplified by preparing solutions of same in certain hydrocarbon solvents miscible with the diolefin-containing mixtures. We have further established the solvent capacity for cuprous chloride of the components of the hydrocarbon mixtures which are most readily available in the synthesis of diolefins from the corresponding paraffins and/or olefins as well as the mixtures available from other sources. With knowledge of the solvent capacity of various olefin and/or olefin-paraffin mixtures, we are able to prepare reagent solutions for the separation and recovery of those conjugated aliphatic diolefins which form substantially hydrocarbon-insoluble cuprous chloride complex addition compounds. The solvent action of the olefinic liquid for cuprous halides may be attributed to physical solubility or to the more likely circumstances of the formation of an olefin-cuprous halide complex which differs from the diolefin-cuprous halide complex in being relatively soluble in the hydrocarbon liquid.

We have further discovered that the cuprous halides in solution, regardless of the exact mechanism by which they are dissolved in the above-mentioned hydrocarbon liquids, will react rapidly under the proper conditions when diolefins are mixed therewith to precipitate an insoluble diolefin-cuprous halide complex. The diolefin complex may then be separated from the hydrocarbon liquid and the diolefins recovered from said complex in substantially pure form.

We have discovered that the solubility of cuprous chloride in olefinic hydrocarbons and/or in mixtures thereof varies widely with the individual hydrocarbon and that the solvent capacity of olefinic mixtures can be estimated accurately from the composition. We have further established the relationship between solubility and temperature for various aliphatic mono-olefins and olefinic mixtures and thus have outlined greatly improved methods of operation for the separation of diolefins. Said methods of operation involve the preparation of solutions of cuprous halide reagents in olefinic hydrocarbons, and the mixing of said solutions with hydrocarbon liquids containing diolefins under conditions which cause reaction and the formation of the diolefin addition complex. Also, in order to predict and facilitate the recovery of the diolefins, the solubility of the said addition complexes in various low-boiling hydrocarbon mixtures has been observed. The use of cuprous halides other than the chloride, especially the bromide, is contemplated. Specific solubilities, optimum temperature conditions, etc. are chosen with due regard to the particular halides, olefins, and diolefins used. In general, cuprous chloride is preferred, since its complexes with diolefins are more stable than the complexes of cuprous bromide, for example.

Our process may be applied in conjunction with dehydrogenation processes to prepare diolefins from the corresponding paraffin and/or olefin hydrocarbons. Or it may utilize suitable low-boiling olefin-containing hydrocarbon liquids from any source. In general it embodies the following operations: (1) segregation of mono-olefinic hydrocarbons of optimum solvent capacity for cuprous chloride; (2) solution of cuprous chloride in said solvents under proper temperature conditions; (3) addition of the solutions thus prepared to hydrocarbon liquid mixtures containing the desired diolefins which form hydrocarbon-insoluble cuprous chloride complexes; and (4) separation of the precipitated complex compounds and recovery of the diolefins therefrom.

Although any solution of cuprous halides in low-boiling olefins may be utilized for the precipitation of diolefin-cuprous halide complexes, we have found in carrying out step (2) described above that tremendous and unexpected differences exist in the solvent capacity of various low-boiling aliphatic olefins for cuprous chloride. The most efficient preparation of cuprous chloride solutions for our process thus has required selection of solvents and/or solvent mixtures containing those olefins of maximum solvent capacity. Further, solubility relationships change appreciably with temperature, so that optimum temperature ranges may be observed.

The solubility of cuprous chloride in the readily-available olefins of three to six carbon atoms is illustrated in Table I, together with the variation of the listed solubilities with temperature.

TABLE I

Solubility of cuprous chloride in olefinic hydrocarbon liquids

| Solvent olefin | Weight per cent in solution at— | | | |
|---|---|---|---|---|
| | −100°F. | 34°F. | 70°F. | 125°F. |
| Propylene (C. P.) | <0.75 | <0.75 | | |
| Butene-1 (C. P.) | 0.80 | 13.5 | Solution saturated at 34°F. precipitated at these temperatures. | |
| Butenes-2 (C. P.) | 0.50 | 0.9 | <1.4 | 1.4 |
| Isobutene (C. P.) | <0.70 | 0.6 | | |
| Butene-1 (50%) N-butane (50%) | | 7.0 | 34° F.—solution precipitated. | |
| Pentene-1 | | 5.3 | 34° F.—solution precipitated. | |
| Pentene-2 | 5.0 | 10.1 | 34° F.—solution precipitated. | |
| Hexene-1 | <5.0 | <5.0 | <5.0 | |

In Table I, where a solubility less than a given value is indicated, it means that when that weight of cuprous chloride was mixed with 100 parts of the olefin at the indicated temperature, the entire amount of cuprous chloride did not go into solution. However, in each such case, an appreciable part of the cuprous chloride did dissolve. Thus, all of these lower-boiling olefins are solvents for cuprous chloride, although varying greatly in relative solvent power.

From these and other data we have been able to select optimum operating temperatures in the range of about 10 to 60° F. for the preparation of cuprous chloride solutions, since solubility is adversely affected by values appreciably higher or lower. One exception is for butenes-2, but this solubility is relatively unimportant even at the extreme of 125° F.

The solubility of cuprous chloride in the above-listed solvents appears to be purely ·empirical, since no analogy is apparent in the matter of the position of the double bond. Thus, while butene-1 is greatly superior to butene-2 as a solvent, the 1 and 2-pentenes reverse this relationship. Hexene-1 is almost equivalent to pentene-1, while some complex hexene-2-containing mixtures showed a slightly greater solvent power. The paraffin hydrocarbons are essentially inert. The reasons for these differences in solubility are obscure, and may be related to a varying tendency on the part of the olefins to form addition complexes, perhaps in conjunction with a varying tendency to form true solutions. However, we do not limit ourselves to any such theoretical mechanisms.

The complex addition compounds formed by low-boiling aliphatic conjugated diolefins with cuprous chloride probably have the formula

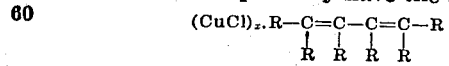

wherein R represents either hydrogen or an alkyl radical and $x$ is a small whole number. In the case of butadiene, this addition compound has the formula $(CuCl)_2.C_4H_6$. The reaction forming the addition compounds is reversible by a number of means. For instance, the diolefin is evolved at measurable rates at temperatures which vary with the particular diolefin and with pressure and are usually above 100° F. at atmospheric pressure. The formation of the addition compounds is favored by low temperatures, and satisfactorily rapid formation is usually obtained below about 40 to 60° F., although extremely low temperatures below 0° F. do not appreciably increase the rate of formation.

Whether the diolefin-cuprous halide complex is formed by reaction of the diolefin with molecular cuprous halide in solution or by a displacement reaction with a cuprous halide-olefin complex in solution is not known. However, knowledge of the exact mechanism is not required, for complete understanding and operation of our invention as disclosed herein, inasmuch as mixture of the diolefin-containing liquid with the olefinic cuprous halide liquid reagents of the present invention ordinarily causes rapid formation of the diolefin-cuprous halide addition compound.

The solubility of these addition compounds in hydrocarbon liquids is very low, and values for the cuprous chloride-butadiene complex are listed in Table II.

TABLE II

*Solubility of cuprous chloride-butadiene complex in olefinic hydrocarbon liquids*

| Solvent | Weight per cent in solution at— | | | |
| --- | --- | --- | --- | --- |
| | −100° F. | 34° F. | 70° F. | 125° F. |
| Propylene | <0.50 | <0.50 | | <0.40 |
| Butene-1 | <0.40 | <0.40 | <0.40 | <0.40 |
| Butene-2 | <0.40 | <0.40 | <0.40 | <0.40 |
| Isobutene | <0.50 | <0.50 | | |
| Pentene-1 | <0.70 | <0.70 | <0.70 | |
| Pentene-2 | <0.40 | <0.40 | <0.40 | |
| Hexene-1 | <0.70 | <0.70 | <0.70 | |
| N-butane–60% Butene-1 20% Propylene 20% | <0.50 | <0.50 | <0.50 | |

These values show that the complex is sufficiently insoluble in the given temperature range to allow choice of operating temperatures within that range for the formation of the complex compounds, and for intermediate processing steps such as filtration, evacuation and the like designed to separate the insoluble addition complex from the liquid hydrocarbon medium and to free the precipitate of unreacted hydrocarbons prior to recovery of the diolefins therefrom.

Since Table I shows maximum solubilities for cuprous chloride in the range of about 10 to 60° F., and since this temperature range is also suitable for precipitating and handling the complex, this range is preferred for the process although higher or lower temperatures may be used within the limits disclosed herein, ranging in general from about −30 to +80° F.

While the solubility of cuprous chloride has been indicated for essentially pure compounds the data may be interpreted to provide the solvent capacity for any mixture containing these hydrocarbons. Thus, the solvent capacity of a mixture is calculated from the composition, with the weight of cuprous chloride dissolved by each component determined on a percentage basis.

In order to bring about complete removal of a reactive diolefin from a hydrocarbon liquid mixture, sufficient cuprous chloride is added in the form of a solution in a low-boiling olefin. The amount of cuprous chloride added may be exactly the reactive quantity, or an excess may be added. Thus, when the weight of diolefin per unit volume of a mixture to be treated is known, the required volume of cuprous chloride solution is added, and the precipitated complex may be removed by suitable means. In such proportioning of the cuprous chloride solution, saturated solutions at the optimum temperature are ordinarily employed although this procedure may be varied if desired, depending on the available solvents and on the diolefin content of the mixture to be treated. On a relative weight basis, the weight of cuprous chloride is quite large compared to the weight of diolefin in the complex. Therefore, saturated solutions of cuprous chloride in liquid of maximum solvent capacity are ordinarily desirable to reduce the volume of solvent required in any specific application. The solvent power of the liquids chosen will depend upon economic and practical considerations. Thus, although the ideal liquid would appear to be a pure olefin of high solvent capacity, the various hydrocarbons utilized in the over-all diolefin producing process will be considered and readily available mixtures of favorable boiling range characteristics will be chosen, and will contain the maximum concentration of olefins of high solvent capacity which may be incorporated therein to advantage, with due regard being had for the ease or difficulty with which the preferred olefins may be concentrated.

The cuprous halide solutions may be prepared by either circulating the solvent liquid at the proper temperature through cuprous halide, or by batch saturation methods in which a volume of solvent is agitated with cuprous halide until saturation is reached, and the supernatant liquid is withdrawn. In such operations, sufficient pressure must be maintained to prevent vaporization of the lower boiling hydrocarbons. These pressures are not excessive at the temperatures employed.

After the solution is prepared, it is mixed with the diolefin-containing liquid in proportions chosen to correspond to reacting quantities of cuprous halide and diolefin or to any desired ratio other than said equivalent quantities. In some instances it may be found desirable to precipitate only a portion of the diolefin in one step, and to remove the remainder in a succeeding step, in which case a quantity of cuprous halide solution less than that equivalent to the entire diolefin content is utilized in each step. The mixing is usually accompanied by some degree of agitation, mechanical or otherwise to assure complete reaction in the body of liquid. This may be accomplished by jet or other mixers or by mechanically driven stirrers or the like. Precautions are observed to avoid precipitation of solids in orifices or other locations from which removal or recovery of the solids would be difficult.

The solid diolefin addition complex ordinarily forms rapidly and separates from the hydrocarbon liquid in crystalline form. Sufficient reaction time is allowed, however, to insure complete precipitation. Super-saturation is sometimes encountered at the low temperatures employed, and this is overcome by such devices as seeding, agitation, or relatively small changes in temperature to initiate the precipitation of the complex.

In order to separate the solid precipitate from the hydrocarbon liquid, means such as pressure filtration, and the like are satisfactory, and the solid material may be freed of volatile unreacted hydrocarbons by evacuation, sweeping with a non-condensible gas or even by gentle heating in combination with the other operations as long as the decomposition temperature of the complex for the particular pressure is not reached.

After all the hydrocarbons exclusive of the chemically combined diolefins have been removed, the diolefins are recovered from the complex by heating at temperatures in the range of about 100 to 210° F. or higher, depending on the pressure and on the particular diolefin and halide used.

The process as described is ordinarily carried out in the substantial absence of water which apparently does not enter into the complex formation, and which does not increase the solubility of cuprous halide in the various solvents. In fact, the complex after formation under relatively anhydrous conditions is kept dry to repress decomposition due to the presence of water. This decomposition may be due to accelerated oxidation of the cuprous salt with consequent destruction of the cuprous salt addition compound.

The co-pending application of Harry E. Drennan and Walter A. Schulze, Serial No. 418,262 filed of even date herewith discloses more fully various processes and operating details for the use of our solutions of cuprous halides in olefin-containing hydrocarbon mixtures for the separation and recovery of diolefins. Our co-pending application, Serial No. 418,263 filed of even date herewith, discloses a cyclic process for the separation and recovery of diolefins by means of said solutions of cuprous halides in olefins, especially in conjunction with catalytic dehydrogenation processes.

The examples given below will serve to illustrate specific applications of the process to the separation of low-boiling aliphatic diolefins from hydrocarbon liquids, but since the examples could be multiplied indefinitely, no limitations are implied. The various hydrocarbon mixtures were under sufficient pressure to maintain them in liquid phase at the indicated temperatures.

EXAMPLE 1

A saturated solution of cuprous chloride in butene-1 was prepared by agitating powdered cuprous chloride in C. P. liquid butene-1 for 10 minutes at a temperature of 32° F., then decanting the clear supernatant liquid. This solution contained about 13 weight per cent of the inorganic salt. This solution was added to a C₄ hydrocarbon liquid mixture containing 12 volume per cent of butadiene in the volume ratio of 4:1. After addition, the mixture was agitated thoroughly and kept at ice temperature for 10 minutes. The diolefin addition complex separated as a crystalline mass which was filtered from the liquid and dried by vaporization of unreacted hydrocarbons. Heating the solid to 190° F. evolved substantially pure butadiene.

EXAMPLE 2

A commercial butene mixture containing 50 volume per cent of butene-1, 40 per cent butene-2, and the balance n-butane was passed slowly through a bed of cuprous chloride at 32° F. The saturated solution thus formed contained about seven weight per cent of cuprous chloride. This solution was mixed in the volume ratio of 2.5 to 1 with a liquid C₃—C₄ mixture containing five volume per cent of butadiene, and the precipitated butadiene complex was filtered from the liquid and desorbed to recover the butadiene with a purity of 98 per cent.

EXAMPLE 3

A saturated solution of cuprous chloride in pentene-2 at 32° F. was mixed with a hydrocarbon liquid containing 10 weight per cent of butadiene. The mixture was agitated for 10 minutes at 30 to 35° F., and the butadiene complex was separated, freed of unreacted hydrocarbons and heated to 200° F. to recover the butadiene.

When pentene-1 was used as solvent for cuprous chloride, approximately twice the volume of saturated solution was required for equivalent formation of the butadiene complex when operating under similar conditions.

EXAMPLE 4

A solution of cuprous chloride in hexene-1 was prepared by mixing the powdered salt in the hydrocarbon liquid for 15 minutes at 40° F., and decanting the resulting solution. This solution was added to a liquid C₄ hydrocarbon mixture containing butadiene at 60° F. with consequent precipitation of large quantities of the butadiene-cuprous chloride complex.

EXAMPLE 5

A saturated solution of cuprous chloride in butene-1 was added at 30° F. to a low-boiling hydrocarbon mixture of four and five carbon atoms containing butadiene and isoprene. The complex compounds separated from the liquid mixture were filtered and decomposed by heat to recover the mixed butadiene and isoprene.

An equivalent reaction was carried out with a saturated solution of cuprous chloride in pentene-2, with a somewhat larger volume of this solution being used for the complex precipitation.

EXAMPLE 6

A low-boiling hydrocarbon liquid containing about 40 per cent of olefins including those of four, five and six carbon atoms was saturated with cuprous chloride at 20° F. A portion of the solution thus formed was mixed with a close-cut C₅ mixture containing piperylene at a temperature of 20° F., and the mixture agitated vigorously. Almost complete recovery of the piperylene was accomplished by precipitation of the complex and subsequent heating of the separated complex.

While the foregoing disclosure has described preferred solvents for the cuprous chloride used in forming diolefin addition compounds, it will be apparent that various mixtures containing these solvents may be used as well as the pure material. By the terms of the disclosure, solvent capacity can be calculated, and improved results may be obtained by the diolefin separation process described.

We claim:

1. A process for the separation of diolefins from mixtures containing the same which comprises contacting said mixtures with a cuprous halide dissolved in liquid hydrocarbons comprising olefins to separate said diolefins as a substantially insoluble diolefin-cuprous halide complex.

2. A process for the separation of diolefins from mixtures containing the same which comprises contacting said mixtures with cuprous chloride dissolved in liquid hydrocarbons comprising olefins to separate said diolefins as a substantially insoluble diolefin-cuprous chloride complex.

3. A process for the separation of butadiene from mixtures containing the same which comprises contacting said mixtures with a cuprous halide dissolved in liquid hydrocarbons comprising olefins to separate said butadiene as a substantially insoluble butadiene-cuprous halide complex.

4. A process for the formation of substantially hydrocarbon-insoluble complex addition compounds of the general formula

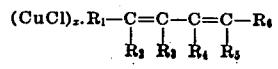

in which $R_1$, $R_2$, $R_3$, $R_4$, $R_5$, and $R_6$ represent radicals chosen from the group consisting of hydrogen and alkyl and $x$ is a small whole number, which comprises reacting conjugated aliphatic diolefins at temperatures in the range of 10 to 60° F. with a solution of cuprous chloride in a hydrocarbon solvent containing a substantial proportion of an olefin which will dissolve at said temperatures at least about 5 weight per cent of cuprous chloride, whereby the said complex addition compounds are precipitated.

5. A process for recovering relatively low-boiling diolefins from liquids containing the same which comprises mixing said liquids with a reagent comprising cuprous chloride dissolved in a hydrocarbon liquid containing substantial amounts of butene-1 to precipitate a cuprous chloride-diolefin complex, and recovering diolefins from said complex.

6. A process for recovering relatively low-boiling diolefins from liquids containing the same which comprises mixing said liquids with a reagent comprising cuprous chloride dissolved in a hydrocarbon liquid containing substantial amounts of a normal pentene to precipitate a cuprous chloride-diolefin complex, and recovering diolefins from said complex.

7. A process for recovering relatively low-boiling diolefins from liquids containing the same which comprises mixing said liquids with a reagent comprising cuprous chloride dissolved in a hydrocarbon liquid containing substantial amounts of hexene-1 to precipitate a cuprous chloride-diolefin complex, and recovering diolefins from said complex.

8. A process for the separation and recovery of relatively low-boiling aliphatic diolefins from hydrocarbon liquids containing the same which comprises mixing said liquids at temperatures below about 60° F. with a solution of cuprous chloride in a liquid hydrocarbon solvent containing a substantial proportion of relatively low-boiling olefin whereby a reaction occurs to precipitate a substantially hydrocarbon-insoluble diolefin-cuprous chloride addition compound, removing unreacted hydrocarbon from said addition compound, and heating said addition compound to decomposition temperatures to recover the diolefins.

9. A process for the recovery of butadiene from a hydrocarbon liquid containing the same which comprises contacting cuprous chloride at temperatures in the range of 10 to 60° F. with a hydrocarbon liquid containing a substantial quantity of butene-1 to form a solution of cuprous chloride, mixing said solution at temperatures in the range of 10 to 60° F. with a butadiene-containing liquid to form the butadiene-cuprous chloride complex, separating said complex from the hydrocarbon liquids, and recovering butadiene from said complex by heating to decomposition temperatures.

10. A process for the separation of a diolefin from a mixture containing the same by means of a reagent comprising cuprous halide, which comprises introducing the cuprous halide into the diolefin-containing mixture in the form of a solution thereof in a liquid solvent comprising an olefin.

WALTER A. SCHULZE.
LLOYD C. MORRIS.